US008881063B2

(12) United States Patent
Winkler et al.

(10) Patent No.: US 8,881,063 B2
(45) Date of Patent: Nov. 4, 2014

(54) METHOD AND APPARATUS FOR VIRTUAL WORLD BASED PRODUCT DESIGN

(75) Inventors: Shenlei Elizabeth Winkler, New York, NY (US); Michael C. Pitman, Wappingers Falls, NY (US); David William Levine, New York, NY (US); David Michael Chess, Mohegan Lake, NY (US); Tracy M. Harris, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 2010 days.

(21) Appl. No.: 11/874,970

(22) Filed: Oct. 19, 2007

(65) Prior Publication Data

US 2009/0106669 A1  Apr. 23, 2009

(51) Int. Cl.
*G06F 3/048* (2013.01)
*G06Q 10/00* (2012.01)

(52) U.S. Cl.
CPC ...................................... *G06Q 10/00* (2013.01)
USPC .......................................................... 715/848

(58) Field of Classification Search
USPC .......................... 715/706, 757, 848, 850, 852
See application file for complete search history.

(56) References Cited

U.S. PATENT DOCUMENTS

| | | | | |
|---|---|---|---|---|
| 6,119,147 | A * | 9/2000 | Toomey et al. | 709/204 |
| 7,012,602 | B2 * | 3/2006 | Watson et al. | 345/419 |
| 2004/0186738 | A1 * | 9/2004 | Reisman | 705/1 |
| 2005/0251462 | A1 * | 11/2005 | Nykamp | 705/27 |
| 2006/0258447 | A1 * | 11/2006 | Baszucki et al. | 463/31 |
| 2007/0011273 | A1 * | 1/2007 | Greenstein et al. | 709/217 |
| 2008/0004093 | A1 * | 1/2008 | Van Luchene et al. | 463/1 |
| 2008/0004118 | A1 * | 1/2008 | Van Luchene et al. | 463/42 |
| 2008/0163054 | A1 * | 7/2008 | Pieper et al. | 715/706 |
| 2009/0293003 | A1 * | 11/2009 | Nykamp | 715/755 |

OTHER PUBLICATIONS

Khemlani Lachmi Exploring second life and its potential in real life AEC Feb. 28, 2007 7 pages.*
Steve Ranger Second Life: How to make it work for business Nov. 1, 2006 3 pages.*
MPK20: Sun's Virtual Workplace retrieved from archive.org dated Mar. 9, 2007 2 pages.*
Adam Reuters IBM eyes move into second life 'v-business' Oct. 24, 2006 1 page.*
Martin Banks IBM's 'secret island' Virtually a new way of doing business Sep. 21, 2006 3 pages.*
Kathleen Craig Making a living in second life Feb. 8, 2006 3 pages.*
Sander van Nederveen "Collaborative design in second life" Second Internation Conference of World Construction Project Management 2007 6 pages.*
M.A. Rosenman, G. Smith, M.L. Maher, L. Ding and D. Marchant, Multidisciplinary collaborative design in virtual environments, Automation in Construction 16 (1) (2007), pp. 37-44.*
Hoffmann, H., Schirra, R., Westner, P., Meinken, K., and Dangelmaier, M. 2007. iTeach: ergonomic evaluation using avatars in immersive environments. In Proceedings of the 4th international Conference on Universal Access in Human Computer interaction: Coping with Diversity (Beijing, China, Jul. 22-27, 2007) pp. 365-373.*
Ian Hughes IBM Metaverse Dec. 2006 2 pages.*
Bochenek, G. M. and Ragusa, J. M. 2003. Virtual (3D) Collaborative Environments: An Improved Environment for Integrated Product Team Interaction?. In Proceedings of the 36th Annual Hawaii international Conference on System Sciences (Hicss'03)—Track 8—vol. 8 (Jan. 6-9, 2003). HICSS. IEEE Computer Society, Washington, DC, 249.1.*
I. Horvath, S. M. J. Vergeest, and Z. Rusak, "Six ingredients of collaborative virtual design environments", Proc. Int. Design Conf., pp. 67-74, 2002.*

* cited by examiner

*Primary Examiner* — Thanh Vu

(74) *Attorney, Agent, or Firm* — August Law, LLC; George Willinghan

(57) ABSTRACT

Systems and methods are provided for conducting the entire development process of new products, such as clothing or fashion designs, from conception through production in a virtual world. The virtual world is a multi-user three-dimensional persistent interactive graphical environment in which a plurality of avatars can interact as if interacting in the physical world to develop a new product. The avatars represent actual individuals that are contributors to the product development process. Each avatar can communicate with other avatars, can interact with and modify the graphical environment and can manipulate three-dimensional objects within the graphical environment for purposes of demonstration, explanation or review. Databases containing the necessary elements for product design are provided and are accessible by the avatars within the graphical environment.

20 Claims, No Drawings

METHOD AND APPARATUS FOR VIRTUAL WORLD BASED PRODUCT DESIGN

FIELD OF THE INVENTION

The present invention relates to virtual reality systems.

BACKGROUND OF THE INVENTION

Common to production design cycles are phases of product development that involve either novel conception or conception as a modification to an existing design template, the specification of components, a specification of how the components are related for function or assembly, the specification of form for each of the components, the selection and full specification of the component materials and the full specification of the product form, composition and assembly with sufficient detail to serve as factory input and compliance to industrial or government standards. Computers assist in the product design throughout the design cycle by facilitating pattern creation, product sketches and three-dimensional (3D) models of the product. The actual computational tools utilized by a product designer vary in the degree to which these computational tools are integrated into the design process varies. The computational tools utilized by large scale engineering are fully integrated, and the computational tools used in garment and clothing accessory design provide for incidental assistance during the design process.

The computational tools used for product design include 3D computer modeling tools, two-dimensional (2D) vector or image based tools, databases that provide efficient access to templates, components, products and standards, workflow management tools and groupware that allows teams to communicate and share documents, images, 2D and 3D models, and 3D animations or simulations, so that a proposed product can be examined by members of the development team during the stages of development.

A virtual world is a system supported by computers that maintains a dynamically changing model of a 3D world with a plurality of models of users, referred to as avatars. The avatars interact with the model or virtual world and can modify this world subject to the prescribed model physics of the worlds and a functional interface. The functional interface includes any combination of objects, actions or functional behavior that is coded by, invoked or implemented through a series of actions. A key aspect of virtual worlds is the explicit representation of each user as an entity that exists in the virtual world, i.e., the avatar. Each avatar interacts with the virtual world and is subject to experiences brought on by actions of others in the world or from the world itself. Virtual worlds allow groups that are remotely distributed in the real world to interact and work together through the interaction of avatars that are each controlled by one of the members of the remotely distributed group in the shared virtual space. In the virtual world, all of the avatars form an avatar group, and all of the members of this group in the virtual world are in close proximity and share a common experience of a world that they as a group can interact with and modify together.

The computational tools used in both the integrated environments that support large scale engineering and the isolated single-user applications that assist design in industries that are not fully integrated, e.g., textiles and clothing accessories design, while providing some level of increased productivity, contain inefficiencies. These inefficiencies result from a lack of a real time collaborative environment and can be costly to the overall production design. Systems and methods are desired that eliminate current inefficiencies of computational tools resulting from a lack of real time collaboration. Suitable systems and methods would provide a fully integrated work flow process in the context of a virtual world to maximize efficiency, bringing all the applications and databases required by a product designer into a common framework and allowing the collaboration in real time among arbitrary and remote groups of individuals that need to examine and to contribute to production design.

SUMMARY OF THE INVENTION

Systems and methods in accordance with the present invention provide a fully integrated production design in a virtual world. A virtual world is created and used to allow individuals from all phases of the design process to interact and to cooperate in real time on any or all aspects of product design at any point in the product design cycle. These individuals cooperate irrespective of their location in the physical world. Virtual world technology is combined with existing applications that facilitate the design process, legacy databases used in-house in the design process, relational databases that support the product workflow stages and process and applications that facilitate collaboration across language barriers. Product designers work entirely in the virtual world, from conception to factory specification. The design process in its entirety is available to record at a desired level of detail. In addition, the design of a given product can be witnessed in real time by any number of remote observers, and these remote observes can interact in the virtual world to provide assistance, guidance, annotation or intervention.

DETAILED DESCRIPTION

Exemplary embodiments of systems and methods in accordance with the present invention improve the efficiency of product design by combining the use of a virtual world, a collaborative environment, a plurality of databases that can be accessed and controlled from within the virtual world and a plurality of specialists with access to the virtual world. The specialists are the actual individuals that perform tasks related to the development of a new product from earliest conception through actual manufacture and sale of a product or implementation of a process. The specialists are represented as avatars within the virtual world. Suitable specialists include, but are not limited to, a designer, a design head, a technical designer, an engineer, a product manager, an attorney, a factory representative, a client and any other personnel required during the product design process. The use of a virtual world for product development and specialist interaction allows the real time collaboration among the plurality of specialists to take place in the full three-dimensional (3D) context of the product at any phase of product development. Interaction in a virtual world reduces sampling waste, sampling time, clarifies communications, decreases time to market and enhances profit margin.

In accordance with exemplary embodiments of the present invention, a multi-user 3D graphical environment is combined with an independent product design database. The interactions occurring within the 3D space can initiate, develop, or modify the product design within the database. Collaborators within the 3D environment are represented to each other visually so that each collaborator can discern and manage any of the other collaborator's attention, and each collaborator has a common shared experience in the full spatial and temporal context of the product design and can undertake discussions with other collaborators.

The full virtual world environment of the present invention provides benefits for virtual design over the simple exchange of text messages and still images, because the virtual world incorporates advantages that are present in actual face-to-face meetings. However, the need for an actual face-to-face meeting and the limitations of the physical world are eliminated. This eliminates the practicalities of the real physical world that make face-to-face meetings costly in terms of time and resources. An essential advantage of a face-to-face meeting in the context of product design is the ability to communicate through demonstration, i.e., the combination of real time 3D visual cues with supporting textual or audio explanations. Each observer of the demonstration receives a first-hand experience of the point being made by the demonstration. That is, each observer receives the demonstration in context. Once in context, each observer can create its own first-hand experiences in fact, with follow-up tests, and perceive the consequences with full cognizance. Communication between observer and communicator is most efficient once the subject matter has been brought into common experience. The depth of the experience can directly relate to the level of attention dedicated to understanding the subject of the experience.

Unlike collaborative tools such as chat clients, messaging applications, streaming voice and video and groupware tools that allow shared screens between computers, the use of a virtual world in accordance with the present invention creates a persistent dynamic world that exists apart from the observer and communicator. The world changes dynamically according to the actions or interactions of its inhabitants, i.e., the avatars, and the model physics deployed, i.e., the prescribed physical constraints under which the virtual world is created. Each observer and communicator is both participant and member of the virtual world, providing an immersive experience for both parties. A key to making this immersive experience effective is the willingness of each party to accept and to participate in this virtual world. Therefore, each avatar, whether an observer or communicator, momentarily accepts the objects, people and physics model of the virtual world as a first-hand experience in actual occurrence and controls the representation of itself in the virtual world as though they were actually present. In other words, each avatar behaves in the virtual world as if they were a real person in the real world. Through perception of the virtual world as a functional surrogate to the real world the benefits in depth of perception that come with first-hand experiences in the real world are harnessed, and the benefits of actual face-to-face meetings are derived from the virtual world.

In the virtual world of the present invention, each communicator controls the experience of the observers in real time through manipulation of objects in the environment, the virtual representation of itself or the virtual representation of the observers. Control of the virtual world experience increases with the level of skill acquired. When communicator and observer are sufficiently skilled in virtual world perception, the communicator has maximum control over the experience of the observer. The interactive virtual world experience of the present invention delivers a functionally real, first-hand experience to the observer, as opposed to a scenario that is imagined through a text or audio description or passively experienced through video. In one embodiment, the attention or focus of each observer within the virtual world is determined using any indication of the location or point of that focus. For example, a communicator utilizes any indication of a given observer's attention to manage that attention and the communication of information to the observer. Therefore, attention determination is a useful component of feedback to the communicator. This attention feedback can be provided through audible or visual indicators provided to the communicator. Providing visual feedback indicating where a given observer's attention is focused provides the virtual world with a component of in-person communications that contributes to the efficiency and value of in-person communications.

The creation or design of products by a plurality of specialists sufficiently skilled in virtual world perception and manipulation and working in a multi-user, 3D, persistent, interactive graphical environment, i.e., a virtual world, achieves the advantages of face-to-face communication and collaboration in the context of product creation and design. The ability of a virtual world product design system to maximize the team effectiveness requires a world of sufficient fidelity to yield first-hand experience to the team. Features and functionalities can be provided within the virtual world to enhance the effectiveness and operational efficiency of the team of specialists working on a given product design. The features and functionalities include, but are not limited to, enhanced modes of transportation within the virtual world including flying and teleporting, creation or importation of arbitrary objects into the virtual world in context and integration of all aspects of preexisting electronic media into the virtual world, i.e., actual cellular phones or personal digital assistants can work within the virtual world.

In one embodiment, processes for the creation or design of a new product include a plurality of stages or phases. These stages include, but are not limited to, creating the product specification, submitting the product specification to quality control, building the specifications sheet, review and validation of the specifications sheet, submission of the specification sheet to the factory for sample or prototype preparation, prototype or factory sample validation against product specification, declaration of approval sample from validated sample and releasing the approval samples to sales. When a purchase order for a given product is initiated, a preproduction or production phase follows. The virtual world of the present invention is used at each phase of the process for design or creation of a new product through preproduction or production to accelerate or to increase the efficiency of each phase.

In one preferred embodiment, the creation of the product specification phase of product design and development includes the combination or combining of the elements or parts that are needed to specify the new product or design. These elements include the parts of a motor, the materials and patterns of a dress and the ingredients in a food product. The exact combination of elements varies depending on the product. In addition to creating wholly new designs, the design specification phase can result in a variation of an existing product or design specification. For example, in the field of clothing design, in fashion accessories design, a design specification for fashion accessories can include a template, a thumbnail sketch, constructions details, e.g., linings, underlinings, interfacings, coatings, undercoatings, surfactants and other topical applications, trims, materials, swatches, colors, e.g., Pantone Match System and other color systems, dimensions (width/height measurements), internal construction such as thread composition, fiber, length of stitch, materials fiber content, thread count, thread dimension, thread weight, description of product, style index, customer, purchase order indexes, date of establishment, revision information, designer identification, collection identification, factory assignee and any other specification artwork, color art or trim art. The virtual world is used to bring the elements of design together in the context of the 3D model of the design, allowing the object to be shaped, colored or textured in the virtual world.

In one embodiment, specialists that are product designers create new products completely within the virtual world. The virtual world facilitates direct access to a database of elements or parts that are used in the creation of the new product or design. These elements or parts can be stored in any suitable database or repository that is accessible from within the virtual world and are brought into the virtual world for viewing and manipulation through any suitable search and retrieval methods. The virtual environment facilitates the creation of a plurality of different arrangements or variations of a proposed new product or design as each combination of elements can be created quickly and does not require the consumption of actual physical materials. In one embodiment, each combination of elements is assigned an alpha-numeric designation. These alpha-numeric designations can be unique for each proposed new product or can be associated with a given group of proposed new products, for example a style number that refers to the new product specification as part of a new design style or a code-name for a proposed product launch or product research and development project. When the alpha-numeric designation refers to a group of new products or new designs, a single group or a plurality of groups can be identified. For example, a plurality of versions of a given design style can be designated.

Each proposed new product specification or new product design as expressed by the combination of elements and having a given alpha-numeric designation is stored in one or more databases for later retrieval, viewing, manipulation and modification. Preferably, the storage database is external to the virtual world or external to the computing system that hosting the virtual world. A given proposed new product specification can be accessed for viewing, commenting and modification by other specialists that have access to the virtual world and have been granted access and modification rights to the proposed new product specifications contained within the databases. Additional records of illustrations or any of the design elements may also be filed into additional databases or catalogs, which may be facilitated by direct access from the virtual world to appropriate databases. Each proposed new product is viewed in full 3D context within the virtual world in an interactive and collaborative environment. Each one of a plurality of specialists may simultaneously examine and discuss a given proposed product or design in the full 3D context. Contributions from the specialists are made in real time, allowing the integration of all criteria directly into the design phase. The combination of the virtual world and collaborative environment maximizes the efficiency of the design process by eliminating the inherent waste due to miscommunication between different specialists in the traditional product design process.

Following the creation of the new product specification, the product specification is submitted to a quality control process. The quality control process evaluates the proposed product or design for originality in a legal sense, for potential violations of customs standards or for adherence to internal and external requirements, policies, standards and guidelines. Within the virtual world, a plurality of specialists simultaneously applies the necessary criteria in the full 3D context in real time. In one embodiment, costing considerations are applied to validate the proposed product specification with respect to specific criteria relating to the cost of materials, material availability, factory availability, material reservations, factory reservations or shipping limitations. Rapid estimation of costing considerations including materials cost or shipping schedules is provided through access by any one of the plurality of specialists to external databases containing the relevant costing data. The specialists working in quality control communicate in 3D in real time to determine and negotiate cost or transportation considerations. In one embodiment, the specialists involved in the negotiations include the originating product developer or designer, facilitating changes or alterations in a given proposed product specification in the full 3D context in real time in order to rectify deviations from prescribed quality control constraints.

In one embodiment, the product or design specification is the basis for a detailed specification sheet that provides all the necessary detail for factory manufacture and sample production. The specification sheet includes, but is not limited to, the full combination of elements in the product specification and any additional information required by the factory or production facility to manufacture the product. In one embodiment, the specification sheet is compared to the product specification for validation as an additional approval process prior to factory submission. The interactive virtual world of the present invention facilitates real time interaction among a plurality of specialists utilizing a full 3D context of the proposed product to complete the detailed specification sheet. The specialists involved in the creation of the detailed specification sheet can include factory or production facility representatives and the developer of the proposed product or design. In general, any number of specialists can be involved in the building of the specification sheet as required.

The detailed specification is then provided to the manufacturing or production facility so that at least one sample or prototype of the proposed product can be created. The manufacturing facility produces the product in accordance with the detailed specification and delivers the sample. Following delivery of the sample or prototype, the sample is compared to the originally proposed product or design and validated. The virtual world is used to validate the sample to the originally proposed product or design in the full 3D context by a plurality of specialists that may apply all needed criteria in real time. An approval sample is defined as a sample that meets the conditions of all aspects of approval and validation against the originally proposed product or design and generated design specification sheet. The declaration of an approval sample then allows the release of the design sample to a sales environment, where sample orders may be taken. The virtual world may facilitate the definition of an approval sample by interfacing to appropriate databases and recording approval or failure on any of a plurality of approval sample criteria.

In one embodiment, a sales order of an approval sample results in a preproduction and/or production phase where samples are taken at each stage of production and validated against the approval sample or the original design. The virtual world allows a plurality of specialists to apply any or all the needed validation criteria in the full 3D context in real time.

In one preferred embodiment, the virtual world allows either sales specialists or clients to interact with any of the design specialists to provide or to make requests for customization or negotiation on any aspect of the design phase in the full 3D context of the design in real time. This includes any degree of customization of the design by the customer or sales specialist. The virtual world allows any client or sales specialist to effect the design directly or indirectly in the full 3D context of the design in real time.

In accordance with one exemplary embodiment, the present invention is directed to a method for product development in a virtual world. The method can be used to take any type of product from first conception to final production including, for example, clothing and fashion, durable goods and consumer products. Initially, a multi-user three-dimensional persistent interactive graphical environment, i.e., the virtual world, is established. The graphical environment is established one or more suitable computing platforms. When multiple computing platforms are used, these platforms can communicate across one or more networks including local area networks and wide area networks. The graphical environment is persistent in that it exists at all times and is not simply initiated when one or more users want to enter, multi-user in that multiple users can simultaneously use and experience the same graphical environment, three-dimensional because objects and graphics are present to users as realistic three-dimensional graphics and interactive in that users can interact with each other and with the graphical environment. The graphical environment is not a passive experience.

Establishment of the graphical interface includes establishing functional interfaces within the graphical environment for interaction between the graphical environment and each one of the plurality of users or avatars located within the graphical environment. The graphical interfaces include manipulatable three-dimensional objects and other interfaces that facilitate the uploading and saving of information and product designs, for travel and for inter-user communication. The graphical environment is established in accordance with prescribed physical limitations for the modification and operation of the physical environment. Actions, interactions and modifications within the graphical environment cannot violate these prescribed physical limitations.

At least one and preferably a plurality of avatars are instantiated or created within the graphical environment. Each avatar corresponds to and is controlled by a real world individual involved in a product development process. These real world individuals include, but are not limited to, designers, product developers, graphic artists, managers, quality control personnel, engineers, manufacturers, customers, supervisors, accountants, attorneys, investors and directors. In general, any individual that would be involved at any point in the product development process can be modeled as an avatar within the graphical environment. Each avatar is capable of interacting with other avatars within the graphical environment and with the graphical environment. The individuals associated with the avatars control their associated avatars and, therefore, interface with the graphical environment using any suitable interface accessible by each individual. These interfaces are known and available in the art and include computer-based interfaces.

In one embodiment, when each one of the plurality of avatars is created within the graphical environment, the identity, role or product development function associated with that avatar is identified. These product development functions are the positions or jobs held by each individual and include designer, product developer, graphic artist, manager, quality control personnel, engineer, manufacturer, customer, supervisor, accountant, attorney, investor or director. The responsibilities and powers vary from position to position. Therefore, functionalities within the graphical environment are assigned to each avatar in accordance with the identified product development function associated with that avatar. These functionalities include a power to access objects within the graphical environment or a power to manipulate objects within the graphical environment. In one embodiment, these functionalities may also have a spatial or temporal component, for example, only providing access to certain areas of the graphical environment or limiting access to certain times or stages of the product development process.

The interactions among the plurality of avatars, for example, as communicator and recipient and interactions between given avatars and the graphical environment, for example, to manipulate three-dimensional objects, are used to develop a new product in accordance with the new product development process associated with that type of product. The actual development process varies from industry to industry. In general, however, the development process is propagated from initial conception to commercial production within the graphical environment. In one embodiment, a plurality of pre-defined scripts is used to dictate or confine the actions of the various avatars. A given script is specific to a given product or industry, and each pre-defined script embodies interaction patterns for avatars involved in the product development process of a particular product. In one embodiment, the development process includes creating a new product specification, conducting a quality control review of a proposed new product specification for compliance with a plurality of pre-determined product parameters, creating a new product specification sheet comprising the new product specification and manufacturing information sufficient to produce the new product, validating the new product specification sheet for compliance with the new product specification, submitting the validated new product specification sheet to a production facility for creation of a sample embodying the new product specification, validating the sample against the new product specification and declaring an approval sample from validated sample and combinations thereof.

In one embodiment, a new product specification is created within the graphical environment. This new product specification includes a combination of elements forming a manipulatable three-dimensional object in the graphical environment. The manipulatable three-dimensional object is a virtual embodiment of the new product specification. The elements can be contained within the graphical environment or imported from databases contained outside the graphical environment. In one embodiment, existing elements to be used in the new product specification and contained within the graphical environment are identified. In addition, additional elements required for the new product specification are imported into the graphical environment from one or more databases accessible from within the graphical environment. The combination of the existing elements and the additional elements are then specified. In addition to specifying new combinations of elements, a previously created product specification can be manipulated or modified to create the new product specification. In one embodiment, a plurality of new product specifications is created. Each new product specification can represent a unique product or design or a variation on a common product or design theme. For purposes of differentiation, a unique alpha-numeric designation is assigned to each new product specification, and the new product specifications along with their designations are stored in a database accessible by all avatars within the graphical environment.

Having used one or more avatars within the graphical environment to develop the new product specification, one or more avatars are used to conduct a quality control review of a proposed new product specification for compliance with a plurality of pre-determined product parameters. In one embodiment, quality control review is conducted by the avatars by interacting in the graphical environment with a manipulatable three-dimensional object embodying the new product specification. Following quality control approval, a new product specification sheet is created within the graphical environment. The new product specification sheet includes a new product specification listing a combination of elements in addition to manufacturing information sufficient to produce the new product. The new product specification sheet is validated within the graphical environment for compliance with the new product specification and submitted to a production facility for creation of a sample embodying the new product specification.

In one embodiment, additional function is provided to the graphical environment by integrating devices having electronic data exchange capabilities and physically located external to the graphical environment, i.e., external to the computing system hosting the graphical environment, into the graphical environment such that avatars can utilize or interact with these devices within the graphical environment. Suitable integrated devices include, but are not limited to, cellular telephones, personal digital assistants, personal computers, haptic devices, force feedback devices, audio equipment, visual equipment and combinations thereof. In addition, additional arbitrary three-dimensional objects can be created within the graphical environment or imported in the graphical environment from external sources. In one embodiment, the focus or attention of a given avatar is used to improve communication and interaction with that avatar. Therefore, a point of focus associated with one of the plurality of avatars is identified. This point of focus is disposed within the graphical environment. From this identified point of focus, a current attention of the avatar is determined, and the current attention is used to communicate with the avatar.

In one embodiment, a plurality of databases is identified for storing data to be used by the avatars in the graphical environment. These databases are disposed external to the graphical environment and are accessible by the avatars within the graphical environment. In one embodiment, each database includes a plurality of elements utilized in each new product specification, previously developed product specifications, industry-specific information, product line information, manufacturing information, quality control standards, avatar profile information, product development logs, marketing information, sales information, accounting information, legal information, approval logs, comments logs, vendor information or customer information.

Methods and systems in accordance with exemplary embodiments of the present invention can take the form of an entirely hardware embodiment, an entirely software embodiment or an embodiment containing both hardware and software elements. In a preferred embodiment, the invention is implemented in software, which includes but is not limited to firmware, resident software and microcode. In addition, exemplary methods and systems can take the form of a computer program product accessible from a computer-usable or computer-readable medium providing program code for use by or in connection with a computer, logical processing unit or any instruction execution system. For the purposes of this description, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Suitable data processing systems for storing and/or executing program code include, but are not limited to, at least one processor coupled directly or indirectly to memory elements through a system bus. The memory elements include local memory employed during actual execution of the program code, bulk storage, and cache memories, which provide temporary storage of at least some program code in order to reduce the number of times code must be retrieved from bulk storage during execution. Input/output or I/O devices, including but not limited to keyboards, displays and pointing devices, can be coupled to the system either directly or through intervening I/O controllers. Exemplary embodiments of the methods and systems in accordance with the present invention also include network adapters coupled to the system to enable the data processing system to become coupled to other data processing systems or remote printers or storage devices through intervening private or public networks. Suitable currently available types of network adapters include, but are not limited to, modems, cable modems, DSL modems, Ethernet cards and combinations thereof.

In one embodiment, the present invention is directed to a machine-readable or computer-readable medium containing a machine-executable or computer-executable code that when read by a machine or computer causes the machine or computer to perform a method for product development in a virtual world in accordance with exemplary embodiments of the present invention and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages. The computer-executable code can be stored on any suitable storage medium or database, including databases disposed within, in communication with and accessible by computer networks utilized by systems in accordance with the present invention and can be executed on any suitable hardware platform as are known and available in the art including the control systems used to control the presentations of the present invention.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. A method for product development, the method comprising:
establishing a multi-user three-dimensional persistent interactive graphical environment;
instantiating a plurality of avatars within the graphical environment, each avatar corresponding to and controlled by a real world individual involved in a commercial product development process and each avatar capable of interacting with other avatars within the graphical environment and of interacting with the graphical environment;
using interactions among the avatars and interactions between given avatars and the graphical environment to develop a new product specification sheet comprising a new product specification for a new commercial product in the commercial product development process;

submitting the new product specification sheet to a real world production facility for creation of a physical embodiment of the new product specification; and manufacturing the physical embodiment of the developed new commercial product in the real world using the submitted new product specification.

2. The method of claim 1, wherein the step of establishing the graphical environment further comprises establishing functional interfaces within the graphical environment for interaction between the graphical environment and each one of the plurality of avatars.

3. The method of claim 2, wherein the functional interfaces comprise manipulatable three-dimensional objects.

4. The method of claim 1, wherein the step of instantiating the plurality of avatars further comprises:

identifying product development functions associated with each one of the plurality of avatars; and granting functionalities within the graphical environment to each avatar in accordance with the identified product development function associated with that avatar.

5. The method of claim 4, wherein the granted functionalities comprise a power to access objects within the graphical environment or a power to manipulate objects within the graphical environment.

6. The method of claim 4, wherein the identified functionalities comprise designer, product developer, graphic artist, manager, quality control personnel, engineer, manufacturer, customer, supervisor, accountant, attorney, investor or director.

7. The method of claim 1, wherein the new product specification comprises a combination of elements forming a manipulatable three-dimensional object in the graphical environment.

8. The method of claim 7, wherein the step of creating the new product specification further comprises:

identifying existing elements within the graphical environment;

importing additional elements into the graphical environment from one or more databases accessible from within the graphical environment; and specifying the combination of the existing elements and the additional elements.

9. The method of claim 1, wherein developing the new product specification further comprises manipulating a previously created product specification to create the new product specification.

10. The method of claim 1, wherein developing the new product specification further comprises:

creating a plurality of new product specifications;

assigning a unique alpha-numeric designation to each new product specification; and storing the new product specifications in a database accessible by all avatars within the graphical environment.

11. The method of claim 1, wherein the step of using the interactions to develop a new commercial product further comprises using one or more avatars to conduct a quality control review of a proposed new product specification for compliance with a plurality of pre-determined product parameters by interacting in the graphical environment with a manipulatable three-dimensional object embodying the new product specification.

12. The method of claim 1, wherein the step of using the interactions to develop a new commercial product further comprises:

creating the new product specification sheet within the graphical environment comprising the new product specification listing a combination of elements and manufacturing information sufficient to produce the new commercial product; and validating the new product specification sheet within the graphical environment for compliance with the new product specification.

13. The method of claim 1, further comprising integrating representations of real world devices comprising electronic data exchange capabilities and physically located external to the graphical environment into the graphical environment such that avatars can utilize or interact with these device representations within the graphical environment while users interact with the real world devices in the real world.

14. The method of claim 13, wherein the real world devices comprise cellular telephones, personal digital assistants, personal computers, haptic devices, force feedback devices, audio equipment, visual equipment or combinations thereof.

15. The method of claim 1, further comprising:

identifying a point of focus associated with one of the plurality of avatars, the point of focus disposed within the graphical environment;

determining a current attention of the avatar based on the identified point of focus; and using the current attention to communicate with the avatar.

16. A method for product development, the method comprising:

establishing a multi-user three-dimensional persistent interactive graphical environment;

instantiating a plurality of avatars within the graphical environment, each avatar corresponding to and controlled by a real world individual involved in a commercial product development process and each avatar capable of interacting with other avatars within the graphical environment and of interacting with the graphical environment;

using the avatars within the graphical environment in the commercial product development process, the commercial product development process comprising at least one of creating a new product specification, conducting a quality control review of the new product specification for compliance with a plurality of pre-determined product parameters, creating a new product specification sheet comprising the new product specification and manufacturing information sufficient to produce the new commercial product, validating the new product specification sheet for compliance with the new product specification, submitting the validated new product specification sheet to a real world production facility for creation of a physical embodiment of the new product specification, validating the sample against the new product specification and declaring an approval sample from validated sample; and manufacturing a new commercial product comprising the physical embodiment of the new product specification in the real world using the submitted validated new product specification.

17. The method of claim 16, further comprising using a database accessible from within the graphical environment in the product development process, the database comprising a plurality of elements utilized in each new product specification, previously developed product specifications, industry-specific information, product line information, manufacturing information, quality control standards, avatar profile information, product development logs, marketing information, sales information, accounting information, legal information, approval logs, comments logs, vendor information or customer information.

18. The method of claim 16, further comprising using a plurality of pre-defined scripts, each pre-defined script embodying interaction patterns for avatars involved in the product development process of a particular product.

19. A computer-readable storage medium containing a computer-readable code that when read by a computer causes the computer to perform a method for product development, the method comprising:
    establishing a multi-user three-dimensional persistent interactive graphical environment;
    instantiating a plurality of avatars within the graphical environment, each avatar corresponding to and controlled by a real world individual involved in a commercial product development process and each avatar capable of interacting with other avatars within the graphical environment and of interacting with the graphical environment;
    using interactions among the avatars and interactions between given avatars and the graphical environment to develop a new product specification sheet comprising a new product specification for a new commercial product in the commercial product development process;
    submitting the new product specification sheet to a real world production facility for creation of a physical embodiment of the new product specification; and
    manufacturing the physical embodiment of the developed new commercial product in the real world using the submitted new product specification.

20. The computer readable storage medium of claim 19, wherein the new product development process further comprises at least one of creating the new product specification, conducting a quality control review of the new product specification for compliance with a plurality of pre-determined product parameters,
    creating the new product specification sheet comprising manufacturing information sufficient to produce the new product,
    validating the new product specification sheet for compliance with the new product specification, submitting the validated new product specification sheet to a real world production facility for creation of a sample embodying the new product specification,
    validating the sample against the new product specification and declaring an approval sample from validated sample.

* * * * *